J. D. Tracy,
Bridle Bit,
Nº 30,510, Patented Oct. 23, 1860.

Witness.
J W Coombs

Inventor.
J D Tracy
per Munn & Co.
Attorneys

UNITED STATES PATENT OFFICE.

J. D. TRACY, OF SPRINGFIELD, MASSACHUSETTS.

ATTACHMENT FOR BRIDLE-BITS.

Specification of Letters Patent No. 30,510, dated October 23, 1860.

*To all whom it may concern:*

Be it known that I, J. D. TRACY, of Springfield, in the county of Hampden and State of Massachusetts, have invented a new and useful Improvement in Bridle-Bits, the Same being Designed to Prevent Cribbing; and I do hereby declare that the following is a full, clear, and exact description of the same, reference being had to the annexed drawings, making a part of this specification, in which—

Figure 1:
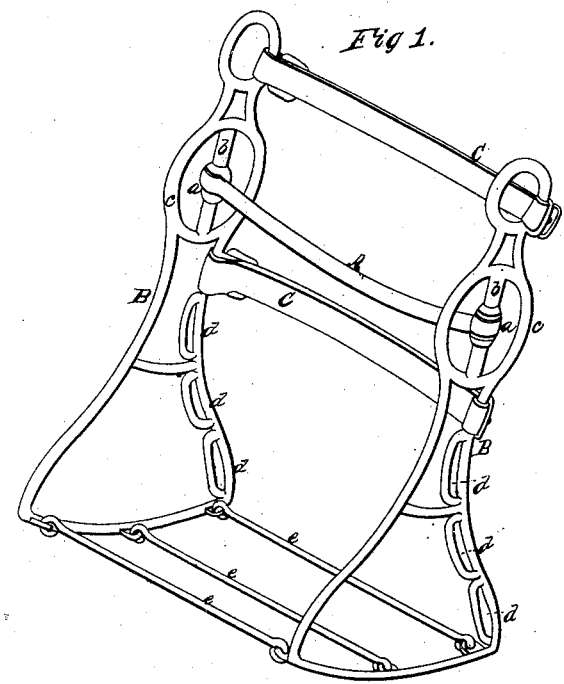
Figure 2:
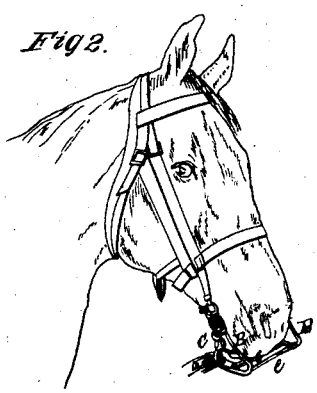

Figure 1, is a perspective view of my invention. Fig. 2 a view of the same attached to a bridle and applied to a horse.

Similar letters of reference indicate corresponding parts in the two figures.

Horses as is well known frequently contract a habit of grasping with their teeth articles within their reach and while biting hard upon them inflate themselves with wind. This habit is technically termed "cribbing" and is very injurious to the animal rendering him exceedingly hard to "keep" and eventually destroying utterly the "style" or general good appearance he may naturally have.

The object of the within described invention is to prevent the practice of this habit while the animal is in harness and to this end I construct the bit with a muzzle like attachment as will be hereinafter shown and described, which will prevent the animal from biting.

To enable those skilled in the art to fully understand and construct my invention I will proceed to describe it.

A, represents the bar of an ordinary bar bit and B, B, the cheek pieces to which the bar A, is attached the ends of the bar being provided with eyes $a$, in which rods $b$, of the cheek pieces B, pass. The rods $b$, are allowed to work or turn in the eyes $a$, and consequently the bar and cheek pieces have an independent movement and are allowed to adjust themselves under the action of the reins and to the movement of the jaw of the animal.

The reins may be secured in the rings $c$, in which the rods $b$, are placed so that the device will operate as an ordinary bar bit, and supplemental reins may be secured in either of a series of loops $d$, in front or below the rings $c$, so as to form a " curb " when necessary.

C, C, are straps which are attached to the cheek pieces B, B, one just in front of or below the bar A, and the other above or back of it. These straps when the bit is adjusted in the mouth of the animal extend underneath the lower jaw and retain the device in proper position.

The cheek pieces B, B, are sufficiently long to project a trifle beyond the mouth of the animal and the ends of the cheek pieces are connected by rods $e$, which extend across the mouth and form a muzzle effectually preventing the animal from grasping any article with his teeth and practicing the habit of " cribbing."

Thus horses in harness when tied to posts, and under sheds, etc., etc., in waiting, will be prevented from practicing the habit aforesaid. The invention will prove valuable for physicians, tradesmen and others whose business compels the use of vehicles and stoppages at dwellings, etc., where animals have an opportunity to indulge in the habit.

Having thus described my invention, what I claim as new and desire to secure by Letters Patent, is—

The construction of the bit with the lower parts of the cheek pieces B, B, made in loop form and provided with muzzling rods $e$, $e$, so as to prevent the animal from biting, all as herein shown and described.

J. D. TRACY.

Witnesses:
E. D. BROCH,
T. B. RAYNOLDS,
ED. M. STONELL.